United States Patent [19]

Longo

[11] Patent Number: 4,872,778
[45] Date of Patent: Oct. 10, 1989

[54] COATING DISPENSING CARTRIDGE AND SPOUT THEREFOR

[76] Inventor: William J. Longo, 35865 Timber Ridge La., Willoughby, Ohio

[21] Appl. No.: 120,992

[22] Filed: Nov. 16, 1987

[51] Int. Cl.⁴ .............................................. B05C 5/02
[52] U.S. Cl. ...................... 401/266; 401/48; 401/193
[58] Field of Search ............... 401/48, 139, 193, 261, 401/265, 266, 9, 1, 2; 222/566; 425/458

[56] References Cited

U.S. PATENT DOCUMENTS

| | | | |
|---|---|---|---|
| 2,903,739 | 9/1959 | Hann | 401/265 X |
| 2,930,061 | 3/1960 | O'Neil | 401/266 |
| 2,988,775 | 6/1961 | Painter et al. | 401/266 |
| 3,279,971 | 10/1966 | Gardener | 401/266 |
| 3,594,089 | 7/1971 | Powell et al. | 401/193 X |
| 3,653,560 | 4/1972 | Adams et al. | 401/266 X |
| 4,260,273 | 4/1981 | Hemperly, Jr. et al. | 401/193 X |
| 4,570,834 | 2/1986 | Ward | 401/266 X |

FOREIGN PATENT DOCUMENTS 2220813 11/1972 Fed. Rep. of Germany ........ 401/48

Primary Examiner—Richard J. Apley
Assistant Examiner—Franklin L. Gubernick
Attorney, Agent, or Firm—Steele, Gould & Fried

[57] ABSTRACT

A coating dispensing cartridge and spout therefor, includes a device defining a guide surface co-planar with the exit end of the spout orifice, to enable the user to press the guide surface flat against the surface to be coated and to maintain it thereagainst, as the cartridge is moved therealong.

11 Claims, 2 Drawing Sheets

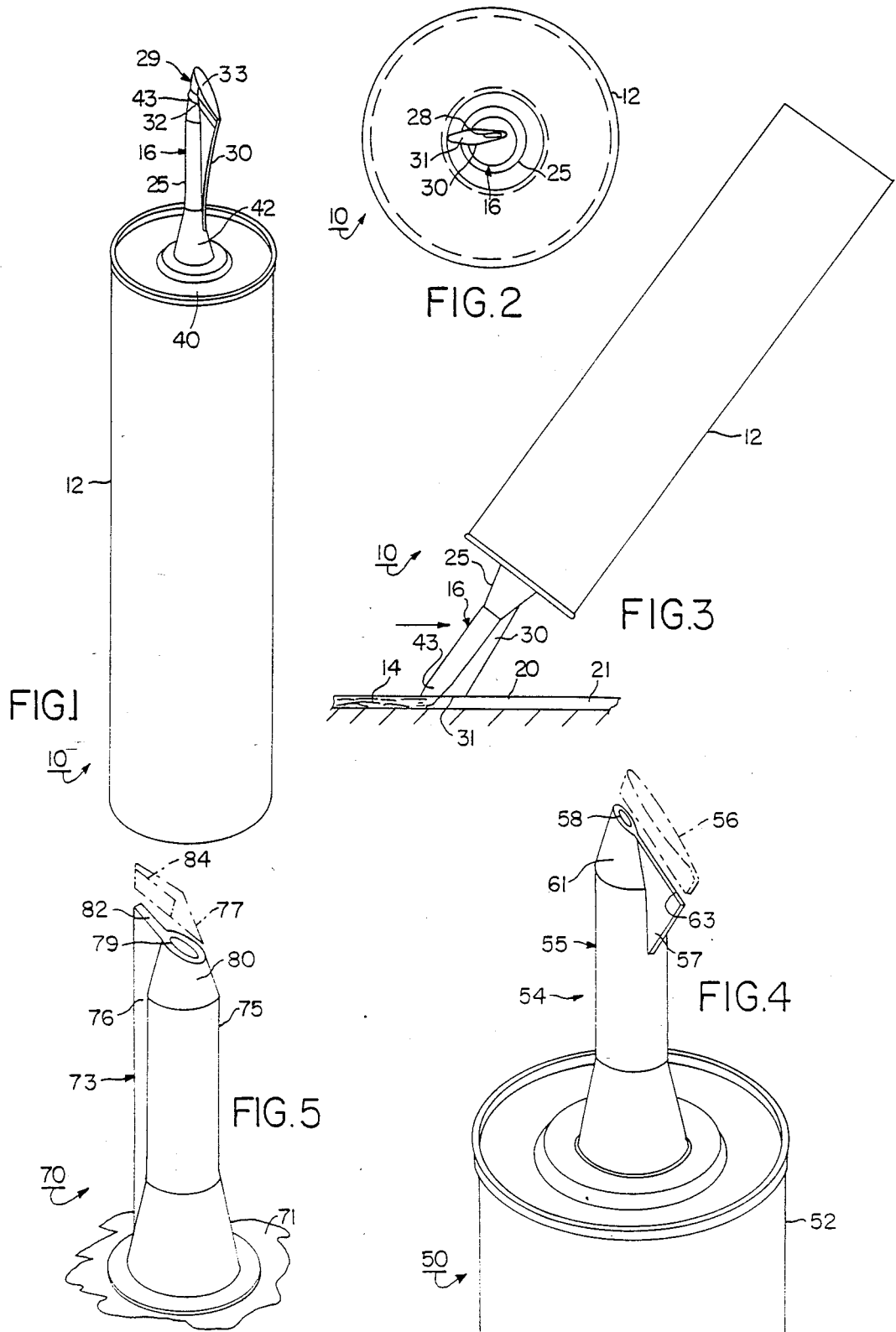

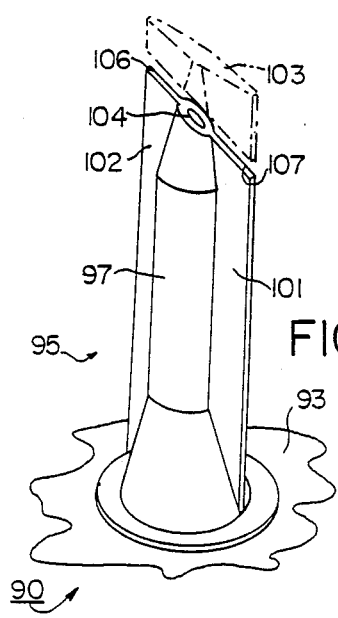
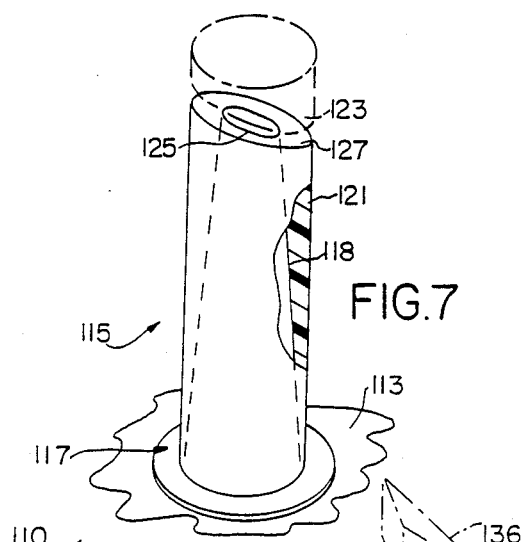
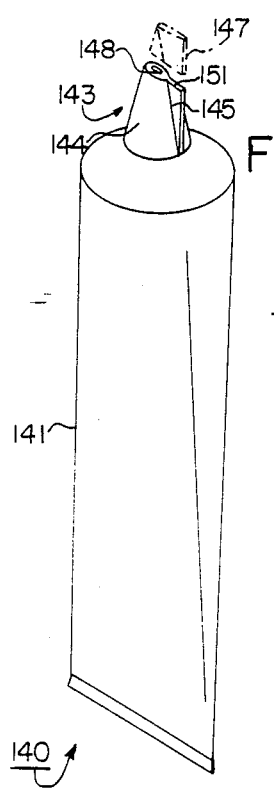
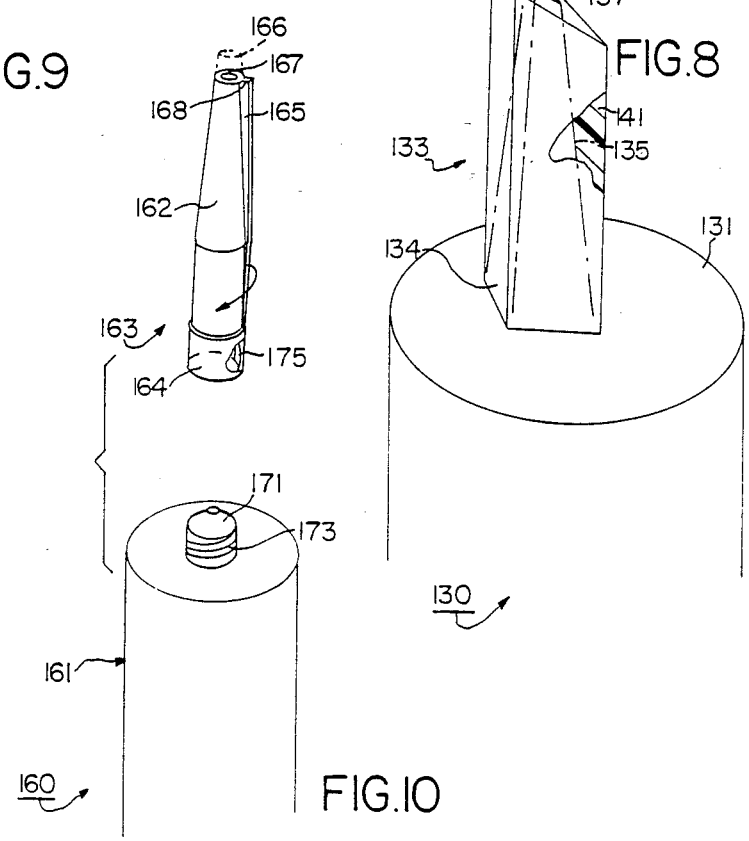

COATING DISPENSING CARTRIDGE AND SPOUT THEREFOR

TECHNICAL FIELD

The present invention relates in general to coating dispensing cartridges and spouts therefor, and it more particularly relates to cartridges for dispensing coatings, such as caulking compounds, sealants, adhesives, and the like.

BACKGROUND ART

Dispensing cartridges of the general type with which the present invention is concerned, are widely employed. They are used in the application of caulking compounds, sealants, adhesives, or a variety of similar coating substances, to gaps, seams, joints or the like, for the interiors and exteriors of buildings and fixtures, such as tubs and sinks, as well as many other such objects requiring the application of suitable coatings. The coating to be applied generally is a viscous, plastic flowable substance and is contained inside the cartridge.

A conventional cartridge generally includes a hollow elongated tubular container for confining the coating, and a tapered spout serving as a port for delivering the contents of the container. Conventional spouts usually have closed tips. When it is desired to use the cartridge, the tip of the spout is cut off at an angle for defining an elliptical shaped orifice to help position the spout properly relative to the surface to be sealed or caulked. Pressure can be applied to the cartridge by means of a conventional caulking gun, or similar mechanism, or by squeezing the tube manually, to cause the coating to flow out of the spout orifice to the adjacent surfaces to be coated.

One of the major problems has been the proper positioning of the head of the caulking compound or other coating to the gap to be coated over with the caulking compound or other coating. In this regard, when attempting to apply caulking compound to an elongated gap by using conventional caulking cartridges, it is difficult, and in some instances impossible, even for the professionals, to cause the caulking bead to be delivered into the desired position all along the gap or area to be coated. The desired position of the bead is to have it enter the gap along its entire length, so as to provide a proper seal when the compound cures.

The desired application can only be achieved by positioning the angularly cut-off spout tip flat against the surface to be caulked, directly over the gap. In this manner, the cartridge is held at an angle inclined toward the surface to be caulked, in the direction of travel of the cartridge. Thus, as the cartridge is moved along the gap, the bead is delivered directly from the spout and downwardly into the gap in the desired manner.

The principal problem has been that the user tends to lift up on the cartridge inadvertently as the cartridge spout is drawn along the surface to be caulked. Thus, at least a portion of the spout cartridge is moved away from the angularly inclined position to a position which is closer to a perpendicular orientation relative to the surface to be caulked. In such a perpendicular orientation, the oval orifice is at least partially spaced from the surface to be caulked, and thus the bead trailing therefrom is free to flow onto the adjacent surface and not enter the gap in the desired manner. Thus, when the bead cures, air infiltration can occur, due to the faulty application of caulking compound.

In an attempt to correct the problem of the misapplied caulking bead, the user has generally resorted to "feathering." Such a feathering operation is accomplished by spreading out the caulk bead and pressing it manually with the user's wetted finger, or hand tool, down into the gap.

However, the feathering of the bead causes the bead to spread out at the edges of the surfaces defining the gap, thus causing the bead to be too thinly applied at the adjacent surfaces. As a result, after the compound dries, the bead tends to break readily, and thus the seal is not properly maintained, thereby resulting in unwanted air infiltration.

Therefore, when feathering is needed, the application of the compound is a two-step process. As such, it is not only unsatisfactory in the resulting application, but also is time consuming and awkward to achieve. Thus the amateur loses interest in performing his or her own caulking or other coating jobs, because of the difficulty involved, in performing the application properly. Also, the professional has a very difficult time in achieving the desired results, due to the foregoing-mentioned problems.

There have been many different types and kinds of devices which have been used for dispensing coatings. For example reference may be made to the following U.S. Pat. Nos.: 845,530; 1,038,180; 1,086,796; 1,126,996; 3,653,560; 4,380,425; and 4,570,834.

One such devices is disclosed in U.S. Pat. No. 4,380,425, and relates in general to a caulking spout for applying sealing compounds. A finger shaped tip extends outwardly from the body of the cartridge for forcing the bead of caulk into the gap to be caulked. However, while the patented device may have been successful in simulating the feathering process, it has not solved, nor even addressed the foregoing-mentioned problem inherently associated with the feathering technique.

Therefore, it would be highly desirable to have a new and improved dispensing cartridge for use in applying caulking compounds or other coatings, whereby the cartridge construction would help facilitate the desired positioning of the spout orifice flat against the surface directly over the gap, as the cartridge is moved therealong. In this manner, the bead would flow directly downwardly into the gap in the desired manner, without the need for subsequent feathering.

DISCLOSURE OF INVENTION

An object of the present invention is to provide a new and improved dispensing cartridge and spout therefor, which facilitate dispensing coating substances into an area, such as a gap, in a uniform and consistent manner.

Another object of the present invention is to provide such a new and improved cartridge and spout, which facilitate the desired positioning of the cartridge in a manner inclined toward the surface to be coated, in the direction of travel of the cartridge, as it moves therealong.

Briefly, the above and further objects of the present invention are realized by providing a dispensing cartridge and spout, which helps the user hold the elliptical spout orifice flat against the surface to be coated as the cartridge moves therealong, without inadvertently lifting up on the spout. Thus, the bead of coating is delivered directly and uniformly into the desired area.

A coating dispensing cartridge and spout therefor, includes a device defining a guide surface co-planar with the exit end of the spout orifice, to enable the user to press the guide surface flat against the surface to be coated and to maintain it in the desired position thereagainst, as the cartridge is moved therealong.

As will become apparent to those skilled in the art, upon consideration of the hereinafter description of the inventive cartridge and spout, the guide surface greatly facilitates the proper positioning of the cartridge during the caulking operation, because the self-aligning spout of the present invention does not tend to lift up off of the surface to be caulked. It becomes almost a simple task for either an amateur or for a profession, to apply the coating bead in a proper manner.

BRIEF DESCRIPTION OF DRAWINGS

The above mentioned and other objects and features of this invention and the manner of attaining them will become apparent, and the invention itself will be best understood by reference to the following description of the embodiments of the invention in conjunction with the accompanying drawings, wherein:

FIG. 1 is a pictorial view of a coating dispensing cartridge, having a self-aligning spout, which are constructed in accordance with the present invention, and which illustrates the spout with a sealed closed tip;

FIG. 2 is an enlarged plan view of the cartridge of FIG. 1, illustrating the spout with its tip cut off to permit delivery of its contents;

FIG. 3 is an elevational view of the cartridge of FIG. 1, illustrating it being used in dispensing a bead of coating to a gap;

FIG. 4 is a pictorial view of another cartridge and self-aligning spout, which are constructed in accordance with the present invention;

FIG. 5 is a pictorial view of yet another cartridge and self-aligning spout, which are constructed in accordance with the invention;

FIG. 6 is a pictorial view of a further cartridge and self-aligning spout, which are constructed according to the present invention;

FIG. 7 is a fragmentary pictorial view of still a further cartridge and a self-aligning spout, which are constructed in accordance with the present invention;

FIG. 8 is a fragmentary pictorial view of yet a further cartridge and self-aligning spout, which are constructed in accordance with the present invention;

FIG. 9 is a pictorial view of a squeeze tube cartridge and a self-aligning spout which are constructed in accordance with the present invention; and FIG. 10 is a fragmentary pictorial view of yet another cartridge and a screw-on self-aligning spout, which are constructed in accordance with the present invention.

BEST MODE FOR CARRYING OUT THE INVENTION

Referring now to the drawings and more particularly to FIGS. 1, 2 and 3, there is illustrated a cartridge 10, which is constructed in accordance with the present invention. The cartridge 10 generally includes a tubular container 12 having stored therein a coating 14 (FIG. 3) to be dispensed. While the coating 14 is shown and described herein is a caulking compound, it should be understood that other types and kinds of coatings such as sealants, adhesive plastic compounds, or other flowable materials can be dispensed from the innovative cartridge 10.

The cartridge 10 further includes a self-aligning applicator spout or dispenser 16 which at the top end of the container 12 for helping guide a dispensed bead of coating 14 along a surface 20, to be caulked, and into a gap 21, in the desired manner.

The spout 16 includes an elongated tubular nozzle 25 for directing the coating to be dispensed from the tip end thereof, in the form of a bead of coating 14. A fin-shaped guide member 30 extends axially along substantially the entire length of the tube 25. The end portion of the member 30 includes a flat guide surface 31 (FIG. 2), when a tip portion 29 (FIG. 1) is cut off along one of a plurality of markings 32 (FIG. 1) disposed on the exterior surface of the tip end of the nozzle 25 and the guide member 30, to expose an orifice 28 (FIG. 2) for delivery of the coating therethrough.

In use, the closed end tip portion 29 (FIG. 1) is first cut off by means of a conventional tool (not shown) along one of the markings 32, to form the orifice 28 and the flat guide surface 31 (FIG. 2). The orifice 28 and the guide surface 31 are then positioned flat against the surface 20 to be caulked over the gap 21. In this manner, the cartridge 10 assumes a position inclined toward the surface 20 in the direction of travel, as shown in FIG. 3.

Pressure is applied by means (not shown), such as by a conventional caulking gun, to the container 12 for forcing the contents to flow therefrom, out of the orifice 28, and into the gap 21. The cartridge 10 is moved manually in the direction of the arrow to apply a bead of coating 14 downwardly into the gap 20.

The guide 30 serves as a support, and is positioned forwardly of the nozzle 25 in the direction of its travel. The large guide surface serves to help the user to maintain the opened end flat against the surface 20. Thus, the user does not tend to lift up on the spout 16 inadvertently, as the cartridge is moved in the direction of the arrow. Therefore, the cartridge is moved in the direction of the arrow. Therefore, the coating does not become inadvertently misapplied, and instead, is properly directed into and along the gap 21.

The guide 30 is generally triangularly shaped along its length. The closed end 29 (FIG. 1) has a flat teardrop shaped end portion 33. The exterior markings 32 encircle the periphery of the nozzle 25 and the guide member 30 at an inclined angle relative to the axis of the nozzle 25. Each one serves as a guide for a tool (not shown), such as a scissors (not shown), for cutting off the closed tip portion 29.

As shown in FIG. 2, once the closed end portion 29 is removed from the end of the spout 16, the flat guide surface 31 is formed at an angle to the axis of the nozzle 25. The guide surface 31 is generally tear-drop shaped and is co-planar with the end portion of the nozzle 25 defining the orifice opening 28. The opening 28 is generally oval in configuration.

As shown in FIG. 3, the guide member 30 is integrally formed with the nozzle 25, and extends externally therefrom in the direction of travel of the cartridge 10. The member 30 extends at its lower end in a tapered manner to the nozzle 25 at a position spaced from the upper end of the tubular container 12.

The nozzle 25 is a hollow tubular member and is connected at its lower end in fluid communication with the interior of the container 12. When the closed end 29 is cut off of the spout 16, the oval orifice 28 is disposed at the opposite top end of the nozzle 25.

The guide member 30 is disposed externally of the nozzle 25 and extends transversely therefrom. The guide surface 31 is inclined at an angle relative to the axle of the nozzle 25, and is disposed adjacent to, and co-planar with, the orifice 25, whereby the guide surface 31 and the portion of the nozzle defining and surrounding the orifice 28, are able to engage the surface 20 to be coated to help maintain the thick end of the spout flat thereagainst.

Considering now the container 12 in greater detail with reference to FIG. 1, it is generally elongated cylindrical in shape. However, it should be understood that other shapes can also be used to contain the coating 14. The container 12 is generally made of foil-lined fiber material, or other such material which is suitable for extended storage of the caulking compound.

A generally circular flat annular top end plate 40 is fixed sealingly to the top end of the container 12. The plate 40 has a central opening, into which the outwardly flared or tapered bottom end 42 of the nozzle 25 is secured sealingly, to connect the nozzle in fluid communication with the hollow interior of the container 12, for enabling the compound to be dispensed therethrough. The plate can be made of any suitable conventional material, such as metal.

Considering now the spout 16 in greater detail with reference to FIGS. 1 and 2, it is generally made of suitable thermoplastic material. The spout 16 can be produced by any suitable molding technique such as by injection molding.

The nozzle 25 has a generally conventional elongated, substantially cylindrical configuration. The nozzle 25 has a conically tapered tip portion 43, which is closed in its distal end portion for preserving the content of the cartridge 10 during storage.

The nozzle 25 is hollow throughout its entire axial length. The guide member 30 is integrally connected to the nozzle 25 to form a one-piece construction.

The pair of parallel marks 32 also extend along the outer periphery of the guide 30 and the conical tip portion 43 of the nozzle 25. The marks are in the form of a pair of rings, which extend in a closed loop configuration on the tip portion 43 and the guide member 30. In this manner, when the tip portion 29 of the spout 16 is cut off along either one of the marks 32, the resulting outermost tip end portion of the spout 16 (FIGS. 2 and 3) is generally flat to define the guide surface 31 and the nozzle surface defining the orifice 28, in order to contact the surface 20, and to be drawn therealong in a smooth and continuous manner.

Referring now to FIG. 4, there is shown a cartridge 50, which includes a tubular container 52 similar to the container 12, and a spout 54. The cartridge 50 and the spout 54 are constructed in accordance with the present invention.

The spout 54 is generally similar to the spout 16 of FIG. 1, and is used in the same manner and for the same purpose. The spout 54 includes a tubular nozzle 55 having an external transversely-extending guide number 57, which is similar to the guide member 30, except that the guide member 57 has a different shape.

The spout 54 has a closed end portion 56, which is similar to the closed end portion 29. When the portion 56 is cut off as indicated in FIG. 4, there is defined an angularly disposed, oval orifice 58 in the distal end of the top conically-shaped tip portion 61 of the nozzle 55. Also defined by the cut-off portion 56 is a guide surface 63, which is similar to the guide surface 3, which is similar to the guide surface 31 of FIG. 2, and which is co-planar with the surface of the tip portion 61 defining the orifice 58.

The guide member 57 is in the form of a fin, which is generally triangular in shape. One side of the triangular configuration forms the guide surface 63.

Referring now to FIG. 5, there is shown a cartridge 70 having a container 71, which is similar to the container 12. A spout 73 is similar to the spout 16, and is connected in fluid communication with the interior of the container 71. The cartridge 70 and the spout 73 are constructed in accordance with the present invention.

The spout 73 includes a nozzle 73, similar to the nozzle 25, and a transversely extending, externally projecting guide member 76, which is similar to the guide member 30, except for its overall shape. The guide member 76 serves the same function as the guide member 30.

The spout 73 includes a closed end tip portion 77, which is similar to the closed end portion 29. When the portion 77 is cut off of the spout 73, there is defined an oval orifice 79 in the tip end 80 of the nozzle 75, and the guide surface 82 of the guide member 76. The guide surface 82 is similar to the guide surface 31 and serves the same function.

The guide member 73 is generally rectangular in configuration, and extends for the entire length of the nozzle 75. An upper closed portion 84 of the closed end 77 is generally rectangular in configuration.

Unlike the guide member 30 of FIG. 1, the guide member 76 extends transversely from the nozzle 75 exactly opposite to the direction of travel of the cartridge. In this regard, the guide surface 82 engages the surface to be coated and trails the nozzle 75 during the coating operation.

Referring now to FIG. 6, there is shown a metal cartridge 90, which includes a container 93, similar to the container 12, and a spout 95, which is similar to the spout 16. The cartridge 90 and the spout 95 are constructed in accordance with the present invention.

The spout 95 includes a nozzle 97, which is similar to the nozzle 25, and a pair of guide members 101 and 102, which extends transversely from diametrically opposed sides of the nozzle 97. The guide member 101 is similar to the guide member 30, in that the member 101 leads the orifice 104 during a coating operation, and less expansive in direction of movement of the cartridge 90. The number 102 is generally similar to the guide member 76 of FIG. 5, in that the member 102 trails the orifice 104 during a coating operation. In this regard, the guide surface 106 extends in a direction exactly opposite to the direction of travel of the spout 95.

Referring now to FIG. 7, there is shown a cartridge 110, which includes a spout 115 which is generally similar to the spout 16, and which projects from an upper end of a container 113, in a similar manner to the container 12. The cartridge 110 and the spout 115 are constructed in accordance with the present invention.

The spout 115 includes a nozzle 117, which is similar to the nozzle 25 and is hollow throughout its length and has an internal conically shaped passage 118.

A closed tip end portion 123 of the nozzle 117 is similar to the closed end portion 29, in that it is able to be cut off to expose an oval shaped orifice 125, serving as the exit end of the passage 118.

A guide member 121 is generally similar to the guide member 30, and is in the form of an enlarged portion surrounding the passage 118. Thus, when the closed end portion 123 is cut off of the end of the nozzle 115, an annular guide surface 127 surrounds the orifice 125. The guide surface 127 is the angularly disposed upper end portion of the enlarged guide member 121. Thus, the guide surface 127 serves the same purpose and function as the guide surface 31, in that the guide surface 127 is moved flat against the surface 31, in that the guide surface 127 is moved flat against a surface (not shown) to be coated to help maintain the nozzle 115 in a proper orientation relative to the surface to be coated as the cartridge 110 moves therealong.

Referring now to FIG. 8, there is shown a cartridge 130, which includes a container 131, similar to the container 12, and a spout 133, which is similar to the spout 16 and the spout 115. The cartridge 130 and the spout 133 are constructed in accordance with the present invention.

The spout 133 includes a nozzle 134, which is generally similar to the nozzle 117, except that the nozzle 134 is generally triangularly shaped throughout its length. A conically shaped passage 135 of the nozzle 134 is similar to the passage 118, except that the passage 135 is triangularly shaped in transverse cross-section throughout the axial length of the passage 135.

A closed tip end portion 136 is generally similar to the closed end portion 29 and the closed end portion 123. When the portion 136 is cut off of the nozzle 134, a triangularly shaped orifice 137 is formed and serves as the exit end of the passage 135.

A guide member 141 serves the same purpose and function as the guide member 30 of FIG. 1 and the guide member 121 of FIG. 7. In this regard, the guide member 141 is in the form of an enlarged portion surrounding the passage 135. When the closed end portion 136 is removed, there is formed a triangularly shaped, flat guide surface 138, which is co-planar with and surrounds the triangularly shaped orifice 137. The guide surface 138 serves the same function and purpose as the guide surface 31 of FIG. 2, and the guide surface 127 of FIG. 7.

The spout 133 is of a one-piece construction, and is preferably formed of thermoplastic material. The container 131 is also composed of the same thermoplastic material, and is integrally connected to the spout 133. The spout 133 and the container 131 are manufactured according to conventional plastic molding techniques, such as by a blow molding operation.

Referring now to FIG. 9, there is shown a cartridge 140, in the form of a squeeze tube container 141 and a spout 143, which is generally similar to the spout 16 of FIG. 1. The cartridge 140 and the spout 143 are constructed in accordance with the present invention.

The container 141 is in the form of a conventional plastic squeeze tube, which can be grasped manually by the user to apply pressure to it for projecting the contents out of the spout 143. The spout 143 includes a nozzle 144, which is similar to the nozzle 25. A guide member 145, is similar to the guide member 30. When a closed end portion 147, similar to the portion 29, is cut off of the spout 143, an oval orifice 148 is formed and is disposed in an angular manner relative to the axis of the container 141. A guide surface 151 similar to the guide surface 31, is disposed in the same plane with the orifice 148.

Referring now to FIG. 10, there is shown a cartridge 160, which includes a container 161 and a spout 163. The container 161 and the spout 163 are constructed in accordance with the present invention.

The container 161 is generally similar to the container 12 of FIG. 1. The spout 163 is similar to the spout 16, except that the spout 163 is removably attachable to the container 161.

A spout 163 includes a nozzle 162 which is similar to the nozzle 25. A transversely extending guide member 165 is similar to the guide member 30.

A closed end portion 166 is similar to the closed end portion 29, and can be cut off as indicated in FIG. 10. When removed, an oval orifice 167 is formed. Also, there is formed a guide surface 168 of the guide member 165 in a similar manner as the guide surface 31 of FIG. 2.

The container 161 includes an outlet 171 at the top end thereof. An externally threaded portion 173 on the other surface of the outlet 171, is adapted to threadably engage an internal thread 175 of a base portion 164 of the spout 163. In this manner, the spout 163 can be threaded onto the outlet 171, and can thus be removed as indicated in FIG. 10. Thus, the spout 163 can be marketed separately from the container 161.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A spout for dispensing flowable materials from a container to coat a surface, comprising:
   a nozzle connected at one of its ends in fluid communication with the container and having means defining an orifice at its opposite end inclined at an angle relative to the axis of the nozzle, said nozzle being substantially tubular, a single guide means extending transversely from one side of said nozzle;
   the entire surface contacting end of said guide means being generally flat with a guide surface inclined at an angle relative to the axis of the nozzle end disposed adjacent to and substantially co-planar with said angled orifice, whereby said guide means is the primary support of said container with nozzle during a dispensing operation of said container.

2. A spout according to claim 1, wherein said guide means is an enlarged portion of said nozzle.

3. A spout according to claim 2, wherein said enlarged portion includes a transversely extending fin.

4. A spout according to claim 3, wherein said fin extends substantially the entire length of said nozzle.

5. A spout according to claim 3, wherein said fin extends part way along the length of said nozzle.

6. A spout according to claim 3, wherein said fin is generally triangular in shape, one side of which forms said guide surface.

7. A spout according to claim 2, wherein said enlarged portion surrounds the hollow interior of said nozzle, and is generally oval shaped in cross section.

8. A spout according to claim 2, wherein said guide surface is generally triangular in cross sectional shape, said enlarged surface surrounds the hollow interior of said nozzle, and said enlarged surface is generally triangularly shaped in cross section.

9. A spout according to claim 2, wherein said guide surface is generally oval in cross sectional shape, said enlarged surface surrounds the hollow interior of said nozzle, and said enlarged surface is generally oval shaped in cross section.

10. A spout according to claim 1, wherein said spout includes spout thread means and said container includes container thread means for interengaging said spout thread means to connect releasably said spout to said container.

11. A spout according to claim 1, wherein said container includes a squeezable tube.

* * * * *